United States Patent
Chen et al.

(10) Patent No.: US 11,611,704 B2
(45) Date of Patent: Mar. 21, 2023

(54) MOTOR CONTROLLER

(71) Applicant: Global Mixed-mode Technology Inc., Hsin-Chu (TW)

(72) Inventors: Wei-Yu Chen, New Taipei (TW); Ching-Lung Tsai, Hsinchu (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 373 days.

(21) Appl. No.: 16/821,973

(22) Filed: Mar. 17, 2020

(65) Prior Publication Data

US 2021/0297572 A1 Sep. 23, 2021

(51) Int. Cl.
*H02P 25/034* (2016.01)
*H02P 13/00* (2006.01)
*H04N 5/232* (2006.01)

(52) U.S. Cl.
CPC .......... *H04N 5/2328* (2013.01); *H02P 13/00* (2013.01); *H02P 25/034* (2016.02)

(58) Field of Classification Search
CPC ............................. H02P 25/034; H02P 13/00
See application file for complete search history.

(56) References Cited

U.S. PATENT DOCUMENTS

| | | | | |
|---|---|---|---|---|
| 5,572,099 A | * | 11/1996 | Carobolante | H02P 23/186 388/813 |
| 5,631,527 A | * | 5/1997 | Canclini | G11B 21/083 318/400.29 |
| 2016/0118921 A1 | * | 4/2016 | Tabuchi | H02P 25/034 318/494 |
| 2017/0227162 A1 | * | 8/2017 | Saika | F16M 13/02 |
| 2019/0006964 A1 | | 1/2019 | Kurosawa | |
| 2020/0076349 A1 | * | 3/2020 | Balakrishnan | H02P 23/22 |
| 2022/0282419 A1 | * | 9/2022 | Zhao | D06F 37/42 |

FOREIGN PATENT DOCUMENTS

| | | | |
|---|---|---|---|
| CN | 104067169 B | 4/2016 | |
| CN | 109599888 A | 4/2019 | |
| JP | 2002298307 A | * 10/2002 | ............ G11B 5/012 |
| TW | 540902 | 7/2003 | |
| TW | 201018076 | 5/2010 | |

OTHER PUBLICATIONS

Machien translation of JP2002298307A.*

* cited by examiner

*Primary Examiner* — Kawing Chan
(74) *Attorney, Agent, or Firm* — Winston Hsu

(57) ABSTRACT

A motor controller used for driving a motor is provided. The motor includes a motor coil and a maximum rated current. The motor controller comprises a driving circuit, a control unit, a digital-to-analog converter, an operational amplifier, a switch circuit, and a resistor. When it is needed to decrease a settling time for the motor to reach a target position, or a vibration is detected within a camera module so as to enable an image stabilization mechanism, it is capable of temporarily supplying a driving current greater than the maximum rated current to the motor coil.

16 Claims, 2 Drawing Sheets

MOTOR CONTROLLER

BACKGROUND OF THE INVENTION

1. Field of the Invention

The present invention relates to a motor controller, and more particularly, to a motor controller which is capable of temporarily supplying a driving current which is greater than a maximum rated current to a motor coil.

2. Description of the Prior Art

Conventionally, a motor within a camera module has a maximum rated current. If a driving current flowing through a motor coil is greater than the maximum rated current for a long time, the motor may be damaged seriously. However, when it is needed to temporarily supply the driving current which is greater than the maximum rated current to the motor coil for some applications, there is no technique available to perform such function.

Thus, what is needed is the motor controller which is capable of temporarily supplying the driving current which is greater than the maximum rated current to the motor coil.

SUMMARY OF THE INVENTION

According to the present invention, a motor controller used for driving a motor is provided. The motor has a motor coil and a maximum rated current. The motor controller comprises a driving circuit, a control unit, a digital-to-analog converter, an operational amplifier, a switch circuit, and a resistor.

The digital-to-analog converter receives a control signal and a digital input data for generating a voltage to the operational amplifier. The control signal is used for determining if it is needed to supply a driving current which is greater than the maximum rated current to the motor coil.

When it is needed to decrease a settling time for the motor to reach a target position, or a vibration is detected within a camera module so as to enable an image stabilization mechanism, it is capable of temporarily supplying the driving current which is greater than the maximum rated current to the motor coil.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
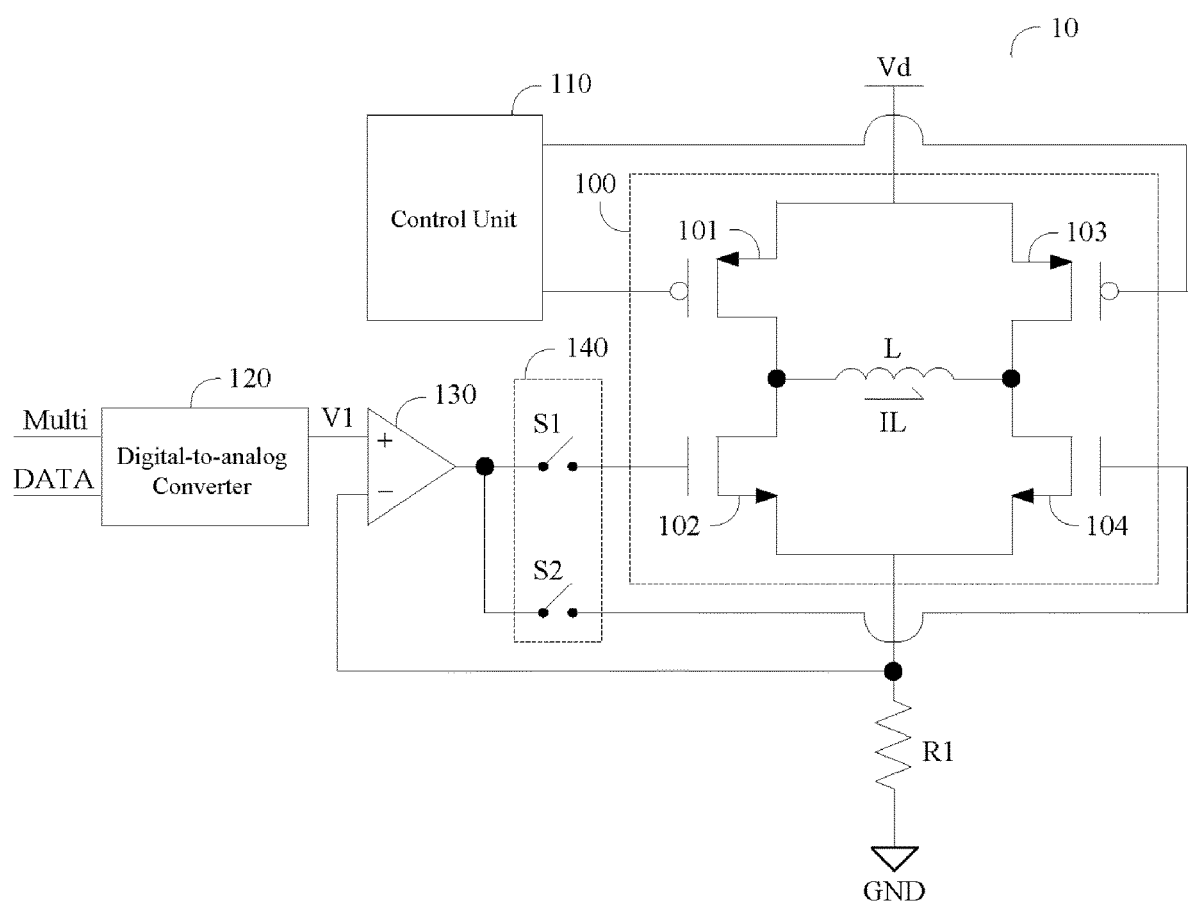
FIG. 1 is a circuit diagram showing a motor controller according to one embodiment of the present invention.

FIG. 1 is a circuit diagram showing a motor controller 10 according to one embodiment of the present invention. The motor controller 10 is used for driving a motor, where the motor may be a voice-coil motor. The motor has a motor coil L and a maximum rated current (Imax). The motor controller 10 comprises a driving circuit 100, a control unit 110, a digital-to-analog converter 120, an operational amplifier 130, a switch circuit 140, and a resistor R1.

The driving circuit 100 includes a transistor 101, a transistor 102, a transistor 103, and a transistor 104 for supplying a driving current IL to the motor coil L. The transistor 101 and the transistor 103 are coupled to a voltage Vd and the motor coil L, while the transistor 102 and the transistor 104 are coupled to the motor coil L and the resistor R1. Transistors 101-104 may be respectively a p-type MOSFET or an n-type MOSFET. As shown in FIG. 1, each of the transistor 101 and the transistor 103 may be a p-type MOSFET, while each of the transistor 102 and the transistor 104 may be an n-type MOSFET.

The control unit 110 is coupled to the transistor 101 and the transistor 103 for controlling a direction of the driving current IL. The switch circuit 140 comprises a switch S1 and a switch S2. The switch S1 is coupled to the transistor 102 for controlling an on/off state of the transistor 102. The switch S2 is coupled to the transistor 104 for controlling an on/off state of the transistor 104. The operational amplifier 130 is coupled to the digital-to-analog converter 120, the switch circuit 140, and the resistor R1. The resistor R1 is coupled to the transistor 102, the transistor 104, and a ground GND.

The digital-to-analog converter 120 receives a control signal Multi and a digital input signal DATA for generating a voltage V1 to the operational amplifier 130, such that the driving current IL is proportional to the voltage V1, thereby controlling a position of the motor M. The control signal Multi is used for determining if it is needed to supply the driving current IL which is greater than the maximum rated current Imax to the motor coil L temporarily. The driving current IL may be N times the maximum rated current Imax, where N is greater than 1. For practical applications, N should be less than or equal to 2 so as to have the best effect.

Figure 2:
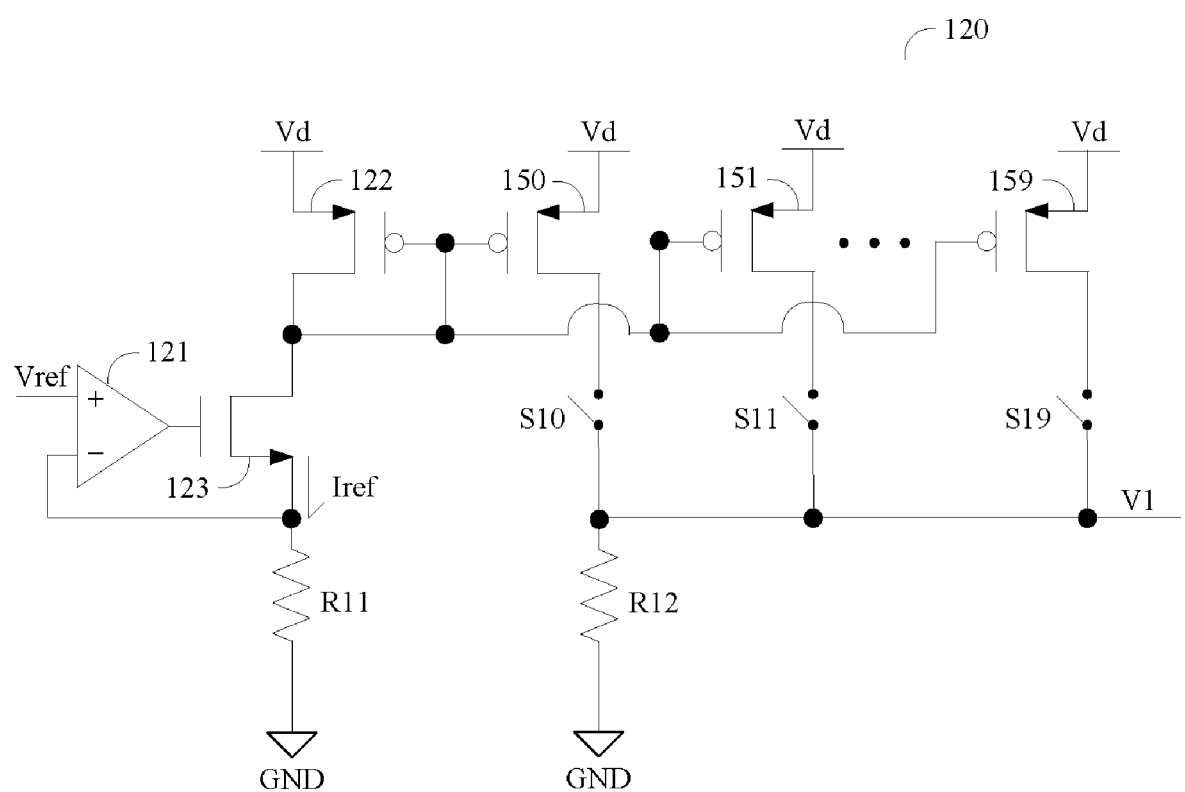
FIG. 2 is a circuit showing a digital-to-analog converter according to one embodiment of the present invention.

FIG. 2 is a circuit showing the digital-to-analog converter 120 according to one embodiment of the present invention. The digital-to-analog converter 120 may be a 10-bit current digital-to-analog converter, and the digital input signal DATA may be a 10-bit digital input signal. The digital-to-analog converter 120 comprises an operational amplifier 121, a transistor 122, a transistor 123, a resistor R11, transistors 150-159, switches S10-S19, and a resistor R12. The size of the transistor 151 is twice the size of the transistor 150, and the size of the transistor 152 is 4 times the size of the transistor 150. That is, the size of the transistor 159 is 512 times the size of the transistor 150 accordingly.

As shown in FIG. 2, the operational amplifier 121 is coupled to the transistor 123 and the resistor R11. The operational amplifier 121 receives a reference voltage Vref for generating a reference current Iref. The transistor 122 is coupled to the voltage source Vd, the transistor 123, and transistors 150-159. Switches S10-S19 are separately coupled to transistors 150-159, where switches S10-S19 are controlled by the 10-bit digital input signal DATA. The resistor R12 is coupled to switches S10-S19 and the ground GND for generating the voltage V1. When the 10-bit digital input signal DATA is 1111111111 and the control signal Multi is at a high level, the driving current IL flowing through the motor coil L may be greater than the maximum rated current Imax.

Please refer to FIG. 1 and FIG. 2 simultaneously. When the control signal Multi is at a low level, the digital-toanalog converter 120 is at a primitive state and it is impossible to provide the driving current IL which is greater than the maximum rated current Imax to the motor coil L. When the control signal Multi is at the high level, it enables a current flowing through the resistor R1 to be N times the original current. Thus, the driving current IL is N times the original current, where N is greater than 1. For practical applications, N should be less than or equal to 2 so as to have the best effect. For example, N may be 1.5 or 2. There are at least four embodiments as follows:

1. Increase the reference voltage Vref to be N times the original voltage. 2. Increase a current flowing through the transistor 122 to be N times the original current. 3. Increase a resistance of the resistor R12 to be N times the original resistance. 4. Decrease a resistance of the resistor R1 to be 1/N times the original resistance.

For some applications, such that it is needed to decrease a settling time for the motor M to reach a target position, or a vibration is detected within a camera module so as to enable an image stabilization mechanism, it is capable of providing the driving current IL which is greater than the maximum rated current Imax to the motor coil L by setting the control signal Multi to be at the high level. Then the control signal Multi is at the low level so that the digital-to-analog converter 120 is at the primitive state.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller configured to drive a motor, wherein the motor comprises a motor coil and a maximum rated current, and the motor controller comprises:
    a driving circuit, configured to supply a driving current to the motor coil;
a control unit, coupled to the driving circuit for controlling a direction of the driving current;
    a switch circuit, coupled to the driving circuit; and
    a control signal, configured to determine if it is needed to supply the driving current greater than the maximum rated current to the motor coil, wherein the driving current is N times the maximum rated current and N is greater than 1, and when it is needed to decrease a settling time for the motor to reach a target position, the driving circuit is capable of temporarily supplying the driving current greater than the maximum rated current.

2. The motor controller of claim 1, wherein N is less than or equal to 2.

3. The motor controller of claim 1, wherein N is 1.5 or 2.

4. The motor controller of claim 1, wherein the driving circuit comprises:
    a first transistor, coupled to a voltage source and the motor coil;
    a second transistor, coupled to the motor coil;
    a third transistor, coupled to the voltage source and the motor coil; and
    a fourth transistor, coupled to the motor coil.

5. The motor controller of claim 4, wherein the switch circuit comprises:
    a first switch, configured to control an on/off state of the second transistor; and
    a second switch, configured to control an on/off state of the fourth transistor.

6. The motor controller of claim 5, further comprising a first resistor, coupled to the second transistor and the fourth transistor.

7. The motor controller of claim 4, wherein each of the first transistor and the third transistor are a p-type MOSFET, and each of the second transistor and the fourth transistor are an n-type MOSFET.

8. The motor controller of claim 1, wherein the motor is a voice-coil motor.

9. The motor controller of claim 1, further comprising a digital-to-analog converter, configured to receive the control signal and a digital input signal for controlling a position of the motor.

10. The motor controller of claim 9, further comprising a first operational amplifier, wherein the digital-to-analog converter generates a voltage to the first operational amplifier, such that the driving current is proportional to the voltage.

11. The motor controller of claim 10, wherein the first operational amplifier is coupled to the switch circuit and the driving circuit.

12. The motor controller of claim 9, wherein the digital-to-analog converter is a current digital-to-analog converter.

13. The motor controller of claim 9, wherein the digital input signal is a 10-bit digital input signal.

14. The motor controller of claim 9, wherein the digital-to-analog converter comprises:
    a fifth transistor;
    a second resistor, coupled to the fifth transistor;
    a second operational amplifier, coupled to the second resistor, wherein the second operational amplifier receives a reference voltage for generating a reference current;
    a sixth transistor;
    a seventh transistor coupled to the sixth transistor;
    an eighth transistor, coupled to the seventh transistor, wherein a size of the eighth transistor is twice a size of the seventh transistor;
    a third switch, coupled to the seventh transistor;
    a fourth switch, coupled to the eighth transistor; and
    a third resistor, coupled to the third switch and the fourth switch.

15. The motor controller of claim 14, wherein the reference voltage is increased to be twice an original voltage based on the control signal.

16. The motor controller of claim 14, wherein a current flowing through the sixth transistor is increased to be N times an original current based on the control signal.

* * * * *